United States Patent [19]

Glazer et al.

[11] 3,827,050

[45] July 30, 1974

[54] METHOD AND MEANS FOR OBTAINING RADIO BEARINGS

[75] Inventors: Burton G. Glazer, Palos Verdes; Michael A. Bittner, Manhattan Beach, both of Calif.

[73] Assignee: The United States of America as represented by the Secretary of the Navy, Washington, D.C.

[22] Filed: Feb. 15, 1973

[21] Appl. No.: 332,967

[52] U.S. Cl. ............................ 343/102, 343/106 R
[51] Int. Cl. .............................................. G01s 1/08
[58] Field of Search ........................ 343/102, 106 R

[56] References Cited
UNITED STATES PATENTS

| | | | |
|---|---|---|---|
| 2,313,048 | 3/1943 | Byrne | 343/102 |
| 2,404,196 | 7/1946 | Seeley | 343/102 |

*Primary Examiner*—Maynard R. Wilbur
*Assistant Examiner*—Richard E. Berger
*Attorney, Agent, or Firm*—R. S. Sciascia; Arthur L. Branning

[57] ABSTRACT

A method for generating D.F. signals having the characteristic that their phase difference is proportional to the azimuth with respect to the radiating source. An array of four, vertical, dipole elements equiangularly spaced with respect to the center of the array is fed with a sine wave which is in phase at all the elements and, simultaneously, with another sine wave which is progressively phase-shifted, in order, around the array. The sine wave carriers may be phase-modulated with orthogonally related, pseudonoise-coded signals.

8 Claims, 3 Drawing Figures

METHOD AND MEANS FOR OBTAINING RADIO BEARINGS

BACKGROUND OF THE INVENTION

This invention relates to electromagnetic signal generation and especially to a method for generating a pair of electromagnetic signals whose phase difference is proportional to their azimuth with respect to a zero-reference direction line.

Present direction-finding signals are unsatisfactory with respect to resistance to jamming signals. In a military situation, an enemy would find them easy to detect and decode. A need exists, therefore, for a direction-finding system which would enable aircraft and other vehicles to navigate or locate their positions relative to ships at sea in an environment where other systems would be rendered useless by enemy electronic jamming and for a system whose signals would be difficult for an enemy to detect and decode.

BRIEF SUMMARY OF THE INVENTION

The present invention provides a method for providing a pair of radiated electromagnetic signals whose phase difference is proportional to their azimuth, or bearing, relative to the signal transmitter. The elements of a multi-element array antenna are fed by two signals. The first signal is a sine wave carrier. The second signal is also a sine wave but is progressively shifted in phase according to the position of the array element being fed.

OBJECTS

An object of the invention is to provide electromagnetic signals whose phase difference is proportional to their azimuth in relation to the transmitter which radiates the signals.

Another object is to produce electromagnetic signals which are difficult to jam electronically.

A further object is to produce electromagnetic signals which an enemy would find difficult to detect and to decode.

Other objects, advantages and novel features of the invention will become apparent from the following detailed description of the invention when considered in conjunction with the accompanying drawings wherein:

DETAILED DESCRIPTION OF THE INVENTION

Figure 1:
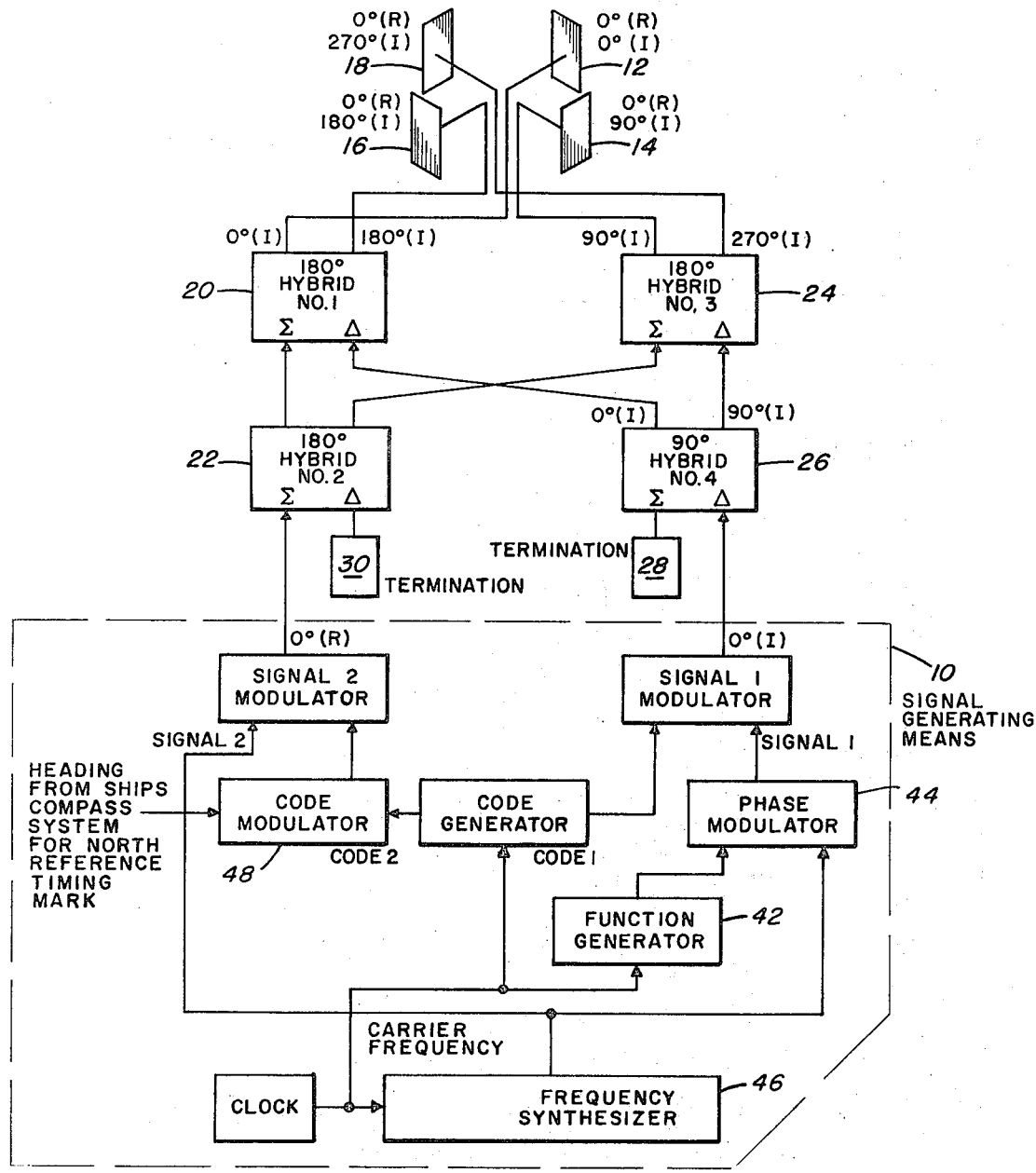
FIG. 1 is a block diagram showing apparatus which can be used to produce the two desired signals.

A signal generating means 10 (see FIG. 1) produces two signals, both of which are sine wave signals which are phase modulated by orthogonal pseudonoise (PN) coded signals. The frequencies of the carriers are different from each other. The production of such signals is known in the art and the equipment for generating the signals will not be further discussed herein.

The antenna for radiating the signals is a multi-element array which may consist of three or more elements. A four-element vertical dipole array is illustrated. This is a standard UHF antenna of four, broadband, vertical dipoles, each located at a corner of a square having its surface in the horizontal plane and its diagonals equal to a half wavelength at the design-center frequency. If this length is used, signals radiated from opposite elements of the array are in phase on the extensions of the diagonals in the far field of the array although the opposite elements are excited 180° out of phase. However, deviations from one-half wavelength can be compensated for electronically to provide an electrical half wavelength between opposite array elements.

The driving signals are fed to the four dipole elements (12, 14, 16 and 18) through an antenna drive network comprising a 90° hybrid junction 26 and three 180° hybrid junctions 20, 22 and 24. The Σ port of the 90° hybrid 26 is terminated in the proper amount of resistance, as is the Δ port of 180° hybrid No. 3 (22). A typical value is 50 ohms.

The first signal (called the information signal, I) is coupled to the Δ port of the 90° hybrid 26; the second signal (called the reference signal, R) is coupled to the Σ port of 180° hybrid No. 2 (22).

The interconnections between the hybrid ports and the dipole elements are such that the phase of the reference signal, R, is the same on all dipole elements (this will hereafter be called "corporate feed"). However, the interconnections of the hybrid junctions are such that the information signal, I, is progressively phase-shifted before being fed to the dipole elements. Thus, the phase of the signal I is 0° at dipole 12, 90° at dipole 14, 180° at dipole 16 and 270° at dipole 18. The progressive phase-shifting type of feed will be called "progressive feed" hereinafter.

The antenna must have at least three radiating elements which should be spaced equiangularly around the center. Thus, the spacing between three array elements would be 120°; instead of the 90° spacing used with the four-element array. However, the four-element array (or multiples of four elements) is the preferred array.

The radiation of these two signals from the array elements results in two electromagnetic fields in space which are out of phase with each other. The peculiar characteristic of these fields, which makes them useful for direction-finding, is that the phase difference between the carrier signals is a monotonic function of their azimuth from a zero reference line which is the radial line drawn from the center of the array elements through the 0° (I) dipole element 12.

To utilize this characteristic, a receiver on an airplane, for example, would carry a phase detector, the phase difference between the two received carrier signals causing an output from the phase detector whose magnitude is directly proportional to azimuth. Thus, the bearing of the airplane from the transmitting ship is directly determinable from the magnitude of the output of the phase detector.

Figure 3:
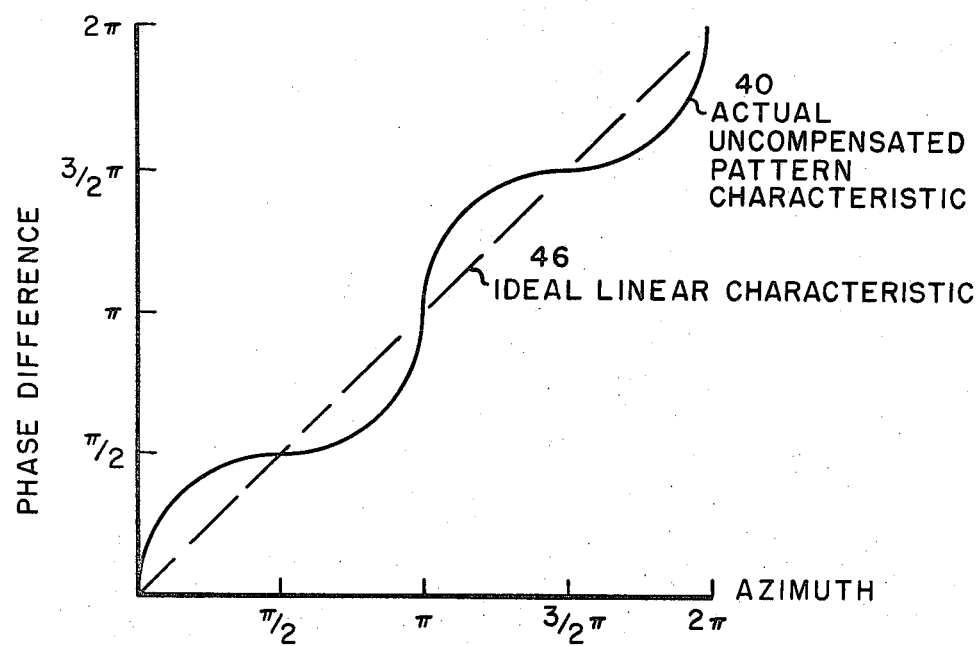
FIG. 3 is a graph which shows the phase error relative to antenna azimuth in an uncompensated transmission.

If the antenna assembly is driven by two sine waves, the phase difference in the field pattern will not be linear with azimuth but a sinusoidal variation will be imposed on the basic function as shown in curve 40 on FIG. 3, a graph which plots phase difference against azimuth. It can be seen that the uncompensated signal pattern 40 produced by the antenna when driven by the components in the signal generating means 10, excluding the function generator 42 and the phase modulator 44, has a non-linear relationship between azimuth and the phase difference (difference between the reference and information signals). The number of deviations in the uncompensated characteristic from the ideal characteristic is typically equal to the number of elements in the array, in this case, four.

Figure 2:
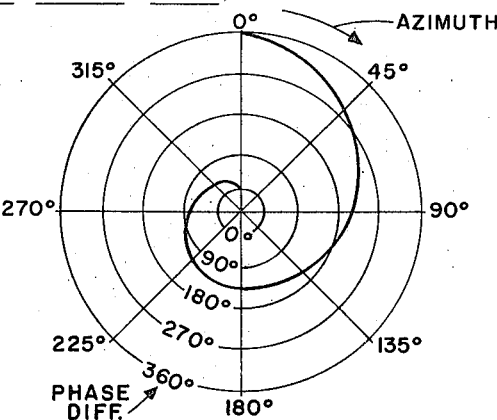
FIG. 2 is a polar plot showing the difference in phase of the two radiated signals with respect to azimuth.

The error can be compensated and this is accomplished in three steps. Firstly, the phase pattern is caused to rotate rather than to remain in the static position shown in FIG. 2, by making SIGNAL 1 from the frequency synthesizer 46 slightly different in frequency from SIGNAL 2. The phase pattern will now rotate in azimuth about the antenna at a rate equal to the beat frequency, i.e., at a rate equal to the difference in carrier frequency between SIGNAL 1 and SIGNAL 2. As the average pattern rotates at a constant rate, the various portions of the phase pattern alternately advance and retard in azimuth during their orbits about the antenna in accordance with the phase-azimuth error curve shown in FIG. 3.

Secondly, a phase deviation is introduced in the information signal equal and opposite to the natural phase deviation introduced by the antenna, i.e., equal and opposite to the phase-azimuth error curve in FIG. 3. This is accomplished by means of the phase modulator 44 driven by the function generator 42. Only one particular point in the phase pattern can be made to hold a constant azimuth change rate during its orbit about the antenna. Therefore it is necessary to time its travel around the antenna in order to determine bearing information.

Thirdly, a timing mark on the reference signal (SIGNAL 2) is transmitted whenever the constant-phase-difference point passes through North. This is accomplished by the code modulator 48 for Code 2.

An observer who wishes to determine his bearing from the antenna can now do so by the following procedure:

1. Detect the North timing mark and note its reception time ($T_{north}$).
2. Detect the passage, through his position, of the compensated, constant-phase-difference point in the rotating phase pattern, and note its time of reception as $T_{phase}$.
3. Compute his bearing ($B$) in degrees from the formula $$B = 360 \ (T_{north} - T_{phase})/f_1 - f_2$$

where $f_1$ and $f_2$ are the carrier frequencies of SIGNALS 1 and 2, respectively, in Hertz.

In one embodiment of the invention, the carrier frequencies of the radiated signals from the array antenna were separated by 93.75 Hz, the information signal carrier being higher. The reference signal is usually radiated at a frequency somewhere within the standard U.H.F.-PN ship-to-air communications band, i.e., 225–400 MHZ.

The two sine waves which are fed to the antenna array are preferably modulated by pseudonoise signals, the one modulating the first sine wave being orthogonal in phase to that modulating the second sine wave. This is done because it makes it easier to distinguish at the receiver between two incoming signals when they are orthogonally modulated.

Obviously, many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method for generating a far-field electromagnetic signal comprising the steps of:
   feeding an antenna array comprising at least three radiating elements which are equiangularly spaced around the center of the array with a first electric signal comprising a sine-wave carrier, all said elements being corporately fed; and
   simultaneously feeding said elements a second electric signal comprising a sine-wave carrier, said second signal being progressively fed to said elements;

the resultant electromagnetic signals in the far-field having a difference in carrier phase which is a monotonic function of the azimuth of the point of phase measurement with respect to a predetermined line from the center of the array.

2. A method as in claim 1, wherein said predetermined line is the radial line from the center of the antenna passing through the radiating element on which the phases of both said first and second signals are zero.

3. A method as in claim 1, wherein said radiating elements are vertical dipole elements.

4. A method as in claim 1, wherein the number of array elements is four, the elements forming the corners of a square and the distance between opposite elements in the array being substantially one-half wavelength at the center frequency of the radiated band.

5. A method as in claim 1, wherein said two sine-wave carriers are different in frequency.

6. A method as in claim 1, wherein said two sine-wave carriers are phase-modulated, the modulation signals being orthongonally related.

7. A method as in claim 6, wherein said modulation signals are pseudonoise-coded signals.

8. A method as in claim 1, further including the steps of:
   causing the phase pattern of said electro-magnetic signals in the far-field to rotate in azimuth around said antenna by making the frequencies of said first and second sine-wave carriers slightly different from each other whereby a phase deviation is introduced into the radiation pattern;
   introducing a phase deviation in one of said sine-wave signals equal and opposite to the phase deviation already existing in the far-field phase pattern, said rotating phase pattern now having a single constant-phase-difference point rotating around said antenna; and
   introducing a repetitive timing mark at a predetermined point on that sine-wave signal which does not have the phase deviation, said timing mark being introduced when the bearing between the antenna and said constant-phase-difference point passes through a predetermined compass point.

* * * * *